United States Patent [19]
Mercado

[11] Patent Number: 4,768,869
[45] Date of Patent: Sep. 6, 1988

[54] CATADIOPTRIC IMAGING SYSTEM

[75] Inventor: Romeo I. Mercado, San Jose, Calif.

[73] Assignee: Lockheed Missiles & Space Company, Inc., Sunnyvale, Calif.

[21] Appl. No.: 134,387

[22] Filed: Dec. 17, 1987

Related U.S. Application Data

[62] Division of Ser. No. 676,295, Nov. 29, 1984.

[51] Int. Cl.$^4$ .............................................. G02B 17/00
[52] U.S. Cl. ..................................... 350/505; 350/442
[58] Field of Search .............. 350/505, 442, 443, 444, 350/1.1, 1.2, 1.4

[56] References Cited

U.S. PATENT DOCUMENTS

3,110,752 11/1963 Becker ................................. 350/442
3,529,888 9/1970 Buchroeder ......................... 350/442

Primary Examiner—John K. Corbin
Assistant Examiner—P. M. Dzierzynski
Attorney, Agent, or Firm—John J. Morrissey

[57] ABSTRACT

A catadioptric optical imaging system comprises a dioptric assembly (20) and a catoptric assembly (21), which are positioned with respect to each other to form an imaging system of long focal length. The dioptric assembly (20) comprises two confocal paraboloidal mirrors (22, 23) arranged to form a telescope of the Mersenne type. The catoptric assembly (21) comprises lens elements arranged in two groups, viz., a field group (25) and a relay group (26), which are coaxially disposed with respect to the dioptric assembly (20). Only two different optical materials, viz., calcium fluoride crystal and Hoya LAC7 glass, are used in making the lens elements of the dioptric assembly (20). The dioptric assembly (20) is color-corrected at five wavelengths and has only negligible secondary and higher-order spectra in a wavelength band extending from the ultraviolet region to the near infrared region of the optical spectrum.

12 Claims, 7 Drawing Sheets

FIG_3

FIG_4

FIG_5

FIG_6

FIG_7

FIG_8

FIG_9

FIG_10

FIG_11

CATADIOPTRIC IMAGING SYSTEM

This application is a division of Ser. No. 676,295 filed Nov. 29, 1984.

TECHNICAL FIELD

This invention relates generally to optical imaging systems, and more particularly to optical imaging systems of long focal length.

BACKGROUND OF THE INVENTION

Aberrations inherent in the design of a dioptric or catadioptric system vary proportionately as the design is scaled up or down, where the scaling factor is the focal length of the system. As the design of a dioptric or catadioptric imaging system of given fixed f-number (also called "relative aperture" or "focal ratio") is scaled up to provide a longer focal length for the system, the monochromatic and chromatic aberrations inherent in the design increase concomitantly as the focal length increases.

An optical imaging system having tolerable monochromatic and chromatic aberrations in a specified wavelength band for a given f-number and given focal length cannot generally be enlarged in scale to provide a longer focal length for the same f-number, while the same degree of correction for monochromatic and chromatic aberrations is maintained. An enlargement in the scale of the imaging system to provide a longer focal length for the same f-number would generally cause the aberrations inherent in the design of the system to increase to such an extent that re-optimization of the design would become necessary in order to reduce the monochromatic and chromatic aberrations to a tolerable level.

Refractive imaging systems having a relatively high degree of color correction at long focal lengths (i.e., at focal lengths longer than a few meters) could be designed using various combinations of optical materials for bringing two or more wavelengths to a common focus. However, until the method described in co-pending U.S. patent application Ser. No. 419,705 for selecting optical materials for designing color-corrected optical systems was discovered, very few pairs of optical materials were known that could be used for designing dioptric and catadioptric systems that are color-corrected at more than two wavelengths. Furthermore, residual chromatic aberrations (i.e., secondary and higher-order spectra) inherent in the designs of refractive imaging systems are usually intolerable at long focal lengths.

SUMMARY OF THE INVENTION

The present invention provides a diffraction-limited catadioptric imaging system of very long focal length.

A catadioptric imaging system according to the present invention is well-corrected for all aberrations, and has only very small residual color error (i.e., secondary and higher-order spectra) in the visible and near infrared regions of the optical spectrum. Furthermore, an imaging system of the present invention has only negligible image degradation at focal lengths as long as 100 meters or more.

The catadioptric imaging system of the present invention comprises a catoptric assembly and a dioptric assembly arranged with respect to each other to form an imaging system of long focal length. The catoptric assembly comprises two confocal paraboloidal reflecting surfaces (viz., a concave primary mirror having a centrally located aperture, and a convex secondary mirror positioned so that the foci of the primary and secondary mirrors coincide), which are arranged to form a telescope of the Mersenne type. The two paraboloidal reflecting surfaces are configured in accordance with conventional design criteria so that the telescope is substantially corrected for all aberrations except field curvature. The telescope is afocal so that light gathered by the primary mirror from a distant object is reflected by the secondary mirror through the central aperture on the primary mirror as a non-converging beam, which can be considered as a bundle of parallel rays.

The dioptric assembly of the catadioptric imaging system of the present invention is located coaxially with respect to the catoptric assembly in the beam emerging from the central aperture on the primary mirror of the catoptric assembly, and comprises two groups of lens elements. Each group of lens elements of the dioptric assembly functions separately as an optical relay. The first group of lens elements is designated as the field group, and the second group of lens elements is designated as the relay group. The entrance pupil for the imaging system is located at the primary mirror of the catoptric assembly.

The field group and the relay group of the dioptric assembly, when used in combination with the Mersenne-type catoptric assembly, form a telephoto imaging system that produces diffraction-limited images of a distant object at two spatially separated focal surfaces. The two images are conjugate real images having different focal ratios and magnifications, and each image is well-corrected for the monochromatic aberrations at all visible wavelengths.

A feature of the present invention is that only two different kinds of optical materials are used to make the lens elements comprising the dioptric assembly, yet color correction is achieved at five wavelengths with only negligible residual color error (i.e., secondary and higher-order spectra at wavelengths between the discrete wavelengths for which color correction occurs). The design form of the dioptric assembly is comparatively simple, requiring only spherical lens surfaces. The field group of the dioptric assembly comprises four lens elements positioned in a Petzval arrangement, and a fifth lens element positioned to function as a field flattener. The relay group of the dioptric assembly comprises four lens elements arranged in the manner of a microscope objective. The field group provides a first image of the distant object at the first focal surface, and the relay group provides a magnified image of the first image at the second focal surface.

The design form for an optical imaging system according to the present invention can be scaled up to a focal length greater than 100 meters, while maintaining diffraction-limited performance and a stable variation of image centroid with respect to wavelength throughout the visible and near infrared regions of the spectrum for narrow field applications.

DESCRIPTION OF THE DRAWING

FIG. 1B is a schematic profile drawing of a portion of an alternative embodiment of an optical imaging system of the present invention, wherein a beam splitter is positioned between the field group and the first focal plane of the system shown in FIG. 1A in order to change the direction of the optic axis of the system.

FIG. 2, which comprises FIGS. 2A and 2B drawn on separate sheets to facilitate their perusal in juxtaposition, is an enlarged profile drawing of the optical imaging system of FIG. 1A with the dioptric assembly located at position A.

BEST MODE OF CARRYING OUT THE INVENTION

Figure 1A:
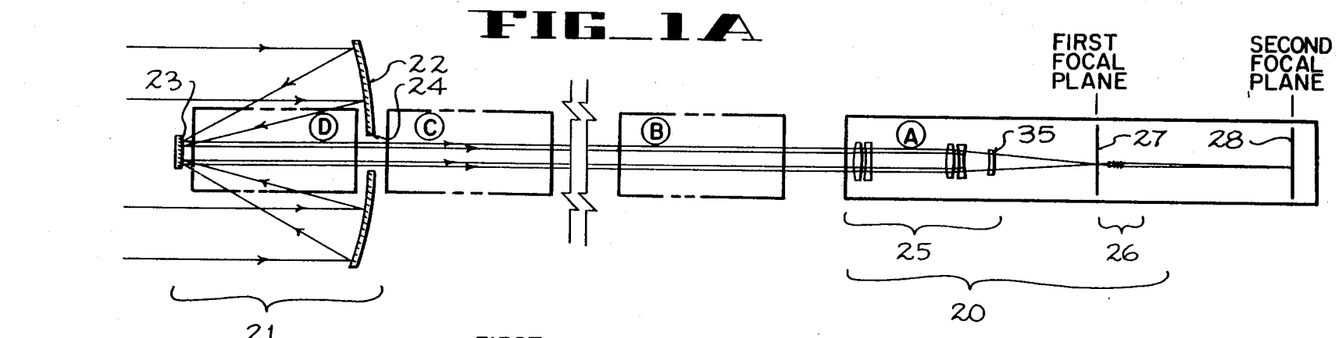
FIG. 1A is a schematic profile drawing of an optical imaging system of the present invention comprising an afocal telescope of the Mersenne type and a dioptric assembly having lens elements made of only two different kinds of optical materials, where four possible positions A, B, C and D for the dioptric assembly relative to the telescope are indicated.

In FIG. 1A, a long-focus catadioptric imaging system comprising a dioptric assembly 20 and a catoptric assembly 21 is illustrated in schematic profile. The catoptric assembly 21 is configured as a two-mirror afocal telescope of the Mersenne type in which a concave paraboloidal primary mirror 22 and a convex paraboloidal secondary mirror 23 are positioned in fixed disposition with respect to each other so that the reflecting surfaces of the mirrors 22 and 23 face each other with the foci of the two reflecting surfaces coinciding. A discussion of telescopes of the Mersenne type is found in *The History of the Telescope* by Henry C. King, Sky Publishing Corporation, Cambridge, Mass. (1955), pages 48-49.

The imaging system of the present invention as shown in FIG. 1A is rotationally symmetric about a line through the centers of curvature of the reflecting surfaces of the two mirrors 22 and 23, which line defines the optic axis of the system. The entrance pupil of the system is located at the primary mirror 22, which is the larger of the two mirrors 22 and 23. A circular hole 24 is provided at the apex of the primary mirror 22 centered on the optic axis of the system. Light from a distant object (which for convenience is considered as an infinitely distant object) is gathered by the primary mirror 22 and is reflected to the secondary mirror 23, from which the light is reflected through the hole 24 in the primary mirror 22 as a non-converging beam along the optic axis of the system.

In accordance with ray tracing convention, the light emitted by (or reflected from) the infinitely distant object is represented in FIG. 1A by parallel rays directed from left to right. However, as far as the utility of the imaging system of the present invention is concerned, there is no requirement that the object be located infinitely far away from the light-gathering primary mirror 22. An object located at a finite distance from the reflecting surface of the primary mirror 22 could be focussed by appropriately adjusting the separation between the primary mirror 22 and the secondary mirror 23 along the optic axis.

The dioptric assembly 20, as described in detail hereinafter, functions in conjunction with the catoptric assembly 21 as an imaging and relay apparatus that is well-corrected with respect to both chromatic and monochromatic aberrations. However, in accordance with present invention, the dioptric assembly 20 could be used alone as an optical imaging and relay apparatus. The utility of the dioptric assembly 20 is not limited to use in combination with a telescope.

The dioptric assembly 20 comprises lens elements arranged in two groups 25 and 26, which are disposed coaxially with respect to the catoptric assembly 21 along the optic axis of the system, and which are rotationally symmetric with respect to the optic axis of the system. Each of the groups 25 and 26 of lens elements functions independently of the other as an optical relay. For the purpose of describing the invention as illustrated in FIGS. 1A, 1B, 2A and 2B, the first group 25 is designated as the field group, and the second group 26 is designated as the relay group.

Only two different optical materials are used in making the various lens elements comprising the dioptric assembly 20. In accordance with the present invention, these two different optical materials, which are used in fabricating the lens elements in each of the two groups 25 and 26, are selected so that the dioptric assembly 20 is color-corrected at five wavelengths in the visible and near infrared regions of the optical spectrum, and has only negligible residual color error (i.e., secondary and higher-order spectra) at the intervening wavelengths between the five wavelengths for which color correction is achieved.

A method of selecting a pair of optical materials for fabricating tne lens elements of a refractive optical system so as to provide color correction at five wavelengths was described in co-pending U.S. patent application Ser. No. 419,705, which is incorporated herein by reference. Among the color-corrected optical systems described in patent application Ser. No. 419,705 was a collimator, whose lens elements are made from a pair of optical materials consisting of calcium fluoride ($CaF_2$) crystal and Hoya LAC7 glass, which provides color correction at five wavelengths with practically negligible residual color error in the visible and near infrared regions of the spectrum.

In setting out to design a refractive optical imaging system for an application requiring color correction at five wavelengths with only negligible residual color error at the intervening wavelengths, an optical designer with knowledge of the disclosure in patent application Ser. No. 419,705 would realize that the pair of optical materials consisting of calcium fluoride crystal and Hoya LAC7 glass could oe used for designing such a system. However, having selected this pair of optical materials, the designer would then have to apply his skill in developing a design form fcr the system in which the monochromatic aberrations as well as the chromatic aberrations are corrected to satisfy the image quality requirements of the system.

Figures 1B, 2A:
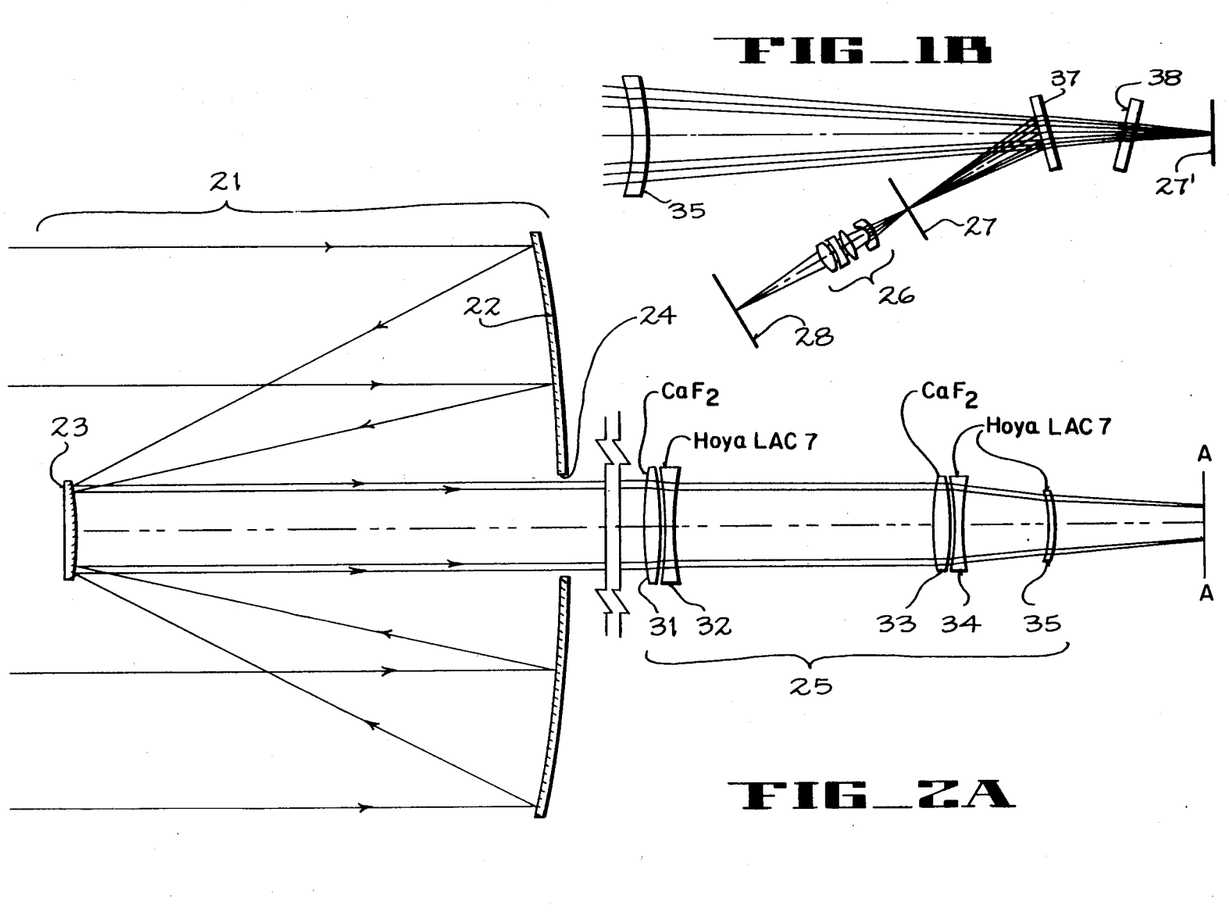
Figure 2B:
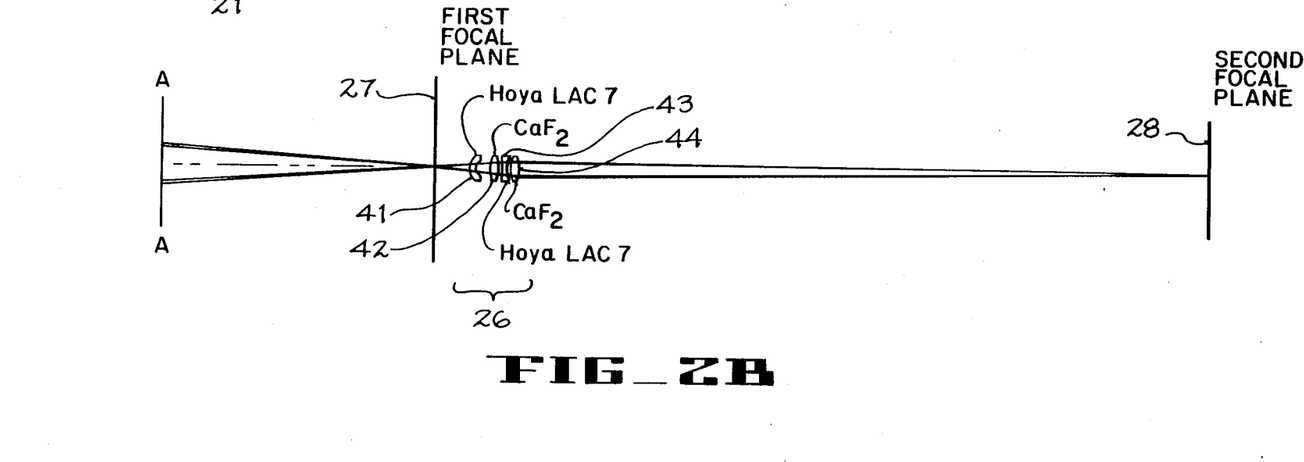

The dioptric assembly 20, as illustrated in FIG. 1A and as shown in greater detail in the enlarged view obtained by juxtaposing FIGS. 2A and 2B, comprises some lens elements made of calcium fluoride crystal and other lens elements made of Hoya LAC7 glass. Disks (and other shapes) of calcium fluoride crystal ready for grinding and polishing to optical specifications are commercially available from suppliers such as Harshaw Chemical Company of Solon, Ohio and Optovac, Inc., of North Brookfield, Mass. Likewise, disks (and other shapes) of Hoya LAC7 glass ready for grinding and polishing to optical specifications are marketed by Hoya Corporation of Tokyo, Japan. The Hoya catalog number "LAC7" is universally understood by optical designers as unambiguously identifying the particular optical glass so specified.

With reference to FIG. 1A, the field group 25 of the dioptric assembly 20 forms a first image of the distant object on a first focal surface 27, and the relay group 26 forms a magnified second image on a second focal surface 28 of the first image appearing on the first focal surface 27. The images formed on the first and second focal surfaces 27 and 28 are conjugate images of the distant object at different f-numbers and different magnifications. The f-number (also called the "relative aperture" or "focal ratio") of an optical system is defined as the ratio of the equivalent focal length f of the system to the diameter of the entrance pupil for the system. For the imaging system shown in FIG. 1A, the subsystem comprising the catoptric assembly 21 and the field group 25 of lens elements located to the left of the first focal surface 27 has an f-number of 7.5, which is conventionally written as f/7.5. The imaging system as a whole (i.e., the catoptric assembly 21 and the entire dioptric assembly 20 to the left of the second focal surface 28) has an f-number of 80, which is written as f/80. The first and second focal surfaces 27 and 28 are substantially planar surfaces.

In FIG. 1A, four different positions A, B, C and D are indicated for the dioptric assembly 20 with respect to the catoptric assembly 21. The positions A, B, C and D are four particular positions for the dioptric assembly 20 from among a continuum of possible positions along the optic axis of the system. The relative locations of the individual lens elements comprising the dioptric assembly 20 remain unchanged with respect to each other, regardless of how the position of the dioptric assembly 20 as a whole may be changed with respect to the catoptric assembly 21.

For any given position of the dioptric assembly 20 relative to the catoptric assemby 21, the design form of the imaging system illustrated in FIG. 1A could be scaled up or down depending upon the operational requirements of the system. For a given scale, the locations of the first and second focal surfaces 27 and 28 remain constant relative to the positions of the individual lens elements of the groups 25 and 26 comprising the dioptric assembly 20, regardless of the position of the dioptric assembly 20 relative to the catoptric assembly 21. A device such as a photographic plate or a charge-coupled device (CCD) could be placed at the second focal surface 28 for detecting the image produced by the system.

For applications in which it is necessary or desirable that the conjugate images formed at the two focal surfaces 27 and 28 be detected simultaneously, it is necessary that a detector be placed at the first focal surface 27 without obstructing the beam that must pass through the relay group 26 to the second focal surface 28. A modification of the imaging system of the present invention, as illustrated in FIG. 1B, enables the conjugate images formed at the focal surfaces 27 and 28 to be detected simultaneously by positioning a beam splitter 37 on the optic axis of the system between the field group 25 and the focal surface 27.

The beam splitter 37 transmits a first portion of the beam along the original direction of the optic axis to a focal surface 27', which is located precisely where the first focal surface 27 would be located in the absence of the beam splitter 37. A detector located at the focal surface 27' detects the image formed by the field group 25 without obstructing the beam passing through the relay group 26 to the second focal surface 28, because the beam splitter 37 in effect changes the direction of the optic axis as far as the relay group 26 is concerned.

The beam splitter 37 reflects a second portion of the beam away from the original direction of the optic axis at an angle determined by the orientation of the reflecting surface of the beam splitter 37 with respect to the original direction of the optic axis. As shown in FIG. 1B, the beam splitter 37 "folds" the optic axis of the imaging system away from its original direction, and the first focal surface 27 is accordingly moved to a new location on the "folded" optic axis. There is no detector at the first focal surface 27 to obstruct the beam passing to the relay group 26. The relay group 26 is located on the folded optic axis, and the magnified second image formed on the second focal surface 28 of the first image appearing on the first focal surface 27 is detected by a detector located at the second focal surface 28. The two focal surfaces 27 and 28 are both located away from the original direction of the optic axis, and hence are unobstructed by the detector at the focal surface 27'.

A compensation plate 38 is positioned between the field group 25 and the focal surface 27' (preferably between the beam splitter 37 and the position 27') along the original direction of the optic axis of the system. The compensation plate 38 is substantially transparent to the first portion of the beam transmitted by the beam splitter 37, and compensates for aberrations introduced by the beam splitter 37. Since no detector is located at the first focal surface 27 on the folded optic axis to obstruct the second portion of the beam transmitted by the field group 25, the detector placed at the second focal surface 28 can detect the image formed at the second focal surface 28, while the detector placed at the focal surface 27' on the original direction of the optic axis can simultaneously detect the image formed at the first focal surface 27.

As shown in detail in FIG. 2A, the field group 25 comprises four lens elements 31, 32, 33 and 34 positioned in a Petzval-type arrangement, and a fifth lens element 35 positioned between the lens element 34 and the first focal surface 27 to function as a field flattener (i.e., to correct the image formed at the first focal surface 27 for field curvature). As shown by juxtaposing FIGS. 2A and 2B so that the line A—A in FIG. 2A coincides with the line A—A in FIG. 2B, the lens elements 31, 32, 33 and 34 are positioned in the beam passing through the aperture 24 so as to bring the beam to a focus at the first focal surface 27. The lens elements 31 and 32 in combination have a net positive dioptric power, and the lens elements 33 and 34 in combination likewise have a net positive dioptric power. Together, the lens elements of the field group 25 provide an image at the first focal plane 27 that is color-corrected at five wavelengths over the visible and near infrared spectral band. As shown in detail in FIG. 2B, the relay group 26 comprises four lens elements 41, 42, 43 and 44 arranged in the manner of a microscope objective to magnify the image appearing at the first focal surface 27, and to focus the magnified image at the second focal surface 28.

The optical prescription of the catadioptric imaging system of the present invention whose dioptric assembly 20 is located at position A, as shown in FIG. 1A, is specified in Table I below in terms of the equivalent focal length f of the entire catadioptric system as follows:

TABLE I

OPTICAL PRESCRIPTION FOR CATADIOPTRIC IMAGING SYSTEM WITH TWO FOCAL SURFACES

| Surface No. | Radius | Thickness | $N_e$ | $V_e$ | Material |
|---|---|---|---|---|---|
| 1 | −.037500 f | −.017580 f | [Primary Mirror] | | |
| 2 | −.002343 f | .017580 f | [Secondary Mirror] | | Air |
| 3 | ∞ | .026385 f | [Hole] | | |
| 4 | .004060 f | .000141 f | 1.43500 | 95.06 | $CaF_2$ |
| 5 | −.004514 f | .000023 f | | | Air |
| 6 | −.004340 f | .000078 f | 1.65426 | 58.15 | LAC7 |
| 7 | −.054611 f | .006008 f | | | Air |
| 8 | .001270 f | .000125 f | 1.43500 | 95.06 | $CaF_2$ |
| 9 | −.002708 f | .000024 f | | | Air |
| 10 | −.005043 f | .000070 f | 1.65426 | 58.15 | LAC7 |
| 11 | .005345 f | .001230 f | | | Air |
| 12 | −.000604 f | .000047 f | 1.65426 | 58.15 | LAC7 |
| 13 | −.000727 f | .001615 f | | | Air |
| 14 | ∞ | .000359 f | [1st Focal Plane] | | Air |
| 15 | .000306 f | .000031 f | 1.65426 | 58.15 | LAC7 |
| 16 | .000249 f | .000092 f | | | Air |
| 17 | .000206 f | .000039 f | 1.43500 | 95.06 | $CaF_2$ |
| 18 | −.000519 f | .000010 f | | | Air |
| 19 | .000884 f | .000030 f | 1.65426 | 58.15 | LAC7 |
| 20 | .000139 f | .000011 f | | | Air |
| 21 | .000158 f | .000039 f | 1.43500 | 95.06 | $CaF_2$ |
| 22 | −.000555 f | | | | Air |
| 23 | ∞ | | [2nd Focal Plane] | | | where the concave paraboloidal reflecting surface of the primary mirror 22 is indicated as surface No. 1, the convex paraboloidal reflecting surface of the secondary mirror 23 is indicated as surface No. 2, the hole 24 is indicated as a dummy or imaginary surface No. 3, the surfaces of the lens elements of the field group 25 are numbered consecutively from No. 4 to No. 13, the first focal surface 27 is indicated as surface No. 14, the surfaces of the lens elements of the relay group 26 are numbered consecutively from No. 15 to No. 22, and the second focal surface 28 is indicated as surface No. 23, in accordance with conventional practice, from left to right along the optic axis of the system.

The "radius" listed in the second column of Table I for each surface is an indicated multiple of the focal length f of the entire catadioptric system, with a positive or negative sign according to whether the particular surface is convex or concave. The mirror surfaces are paraboloidal, and the "radius" for each mirror surface is actually the radius of a sphere that osculates the vertex of the paraboloidal surface. The curvatures of a paraboloidal surface and its osculating sphere are practically the same over a substantial area about the vertex of the paraboloidal surface. The lens surfaces are all spherical, and the "radius" for each lens surface is the radius of curvature of the spherical surface expressed as a multiple of the focal length f of the catadioptric system.

The "thickness" of each lens element and the separation between opposing surfaces on adjacent lens elements are measured along the optic axis of the catadioptric imaging system, and are likewise expressed in Table I as multiples of the focal length f of the entire catadioptric system. The value for thickness (or separation) listed in the third column of the table for each surface refers to the thickness of the lens element (or the spacing between adjacent surfaces) to the right of the indicated surface.

The symbol $N_e$ in the heading of the fourth column of Table I represents the refractive index of the material from which the particular lens element is made as measured at the wavelength of the mercury e line, i.e., $\lambda_0 = 0.54607$ micron.

The symbol $V_e$ in the heading of the fifth column of Table I represents the Abbe number of the material from which the particular lens element is made. The Abbe number is defined as the ratio $$\frac{N_e - 1}{N_F - N_C},$$

where $N_F$ is the refractive index at the cadmium F' line (i.e., 0.47999 micron) and $N_C$ is the refractive index at the cadmium C' line (i.e., 0.64385 micron). The values of the refractive index and the Abbe number listed in the fourth and fifth columns of the table for each lens surface refer to the lens element to the right of the indicated surface.

Each positive lens element of the dioptric assembly 20 is made of calcium fluoride ($CaF_2$) crystal, and each negative lens element is made of Hoya LAC7 glass as indicated in the right-hand column of the table. The material from which each lens element is made technically specified in terms of the index of refraction $N_e$ and the Abbe number $V_e$. However, as a practical matter, optical designers ordinarily specify the material of each lens element in a refractive optical system in terms of the chemical composition (in the case of a crystal) or the manufacturer's name and catalog number (in the case of an optical glass).

The catadioptric imaging system as specified by the optical prescription in Table I includes several subsystems, each of which is useful in its own right independently of its use as a subsystem in the catadioptric imaging system. Thus, with reference to Table I, the subsystem comprising the optical components from surface No. 4 through surface No. 14 form a lens system of the Petzval type, which is independently useful as a dioptric infinite conjugate imaging system that is color-corrected for five wavelengths. The optical prescription for this Petzval lens system, by itself, is specified in Table II below in terms of the equivalent focal length f of the Petzval lens system (i.e., the field group 25 in FIG. 1A).

TABLE II

OPTICAL PRESCRIPTION FOR PETZVAL LENS SYSTEM

| Surface No. | Radius | Thickness | $N_e$ | $V_e$ | Material |
|---|---|---|---|---|---|
| 4 | 0.6930 f | 0.0240 f | 1.43500 | 95.06 | CaF$_2$ |
| 5 | −0.7706 f | 0.0039 f | | | Air |
| 6 | −0.7409 f | 0.0133 f | 1.65426 | 58.15 | LAC7 |
| 7 | −9.3223 f | 1.0255 f | | | Air |
| 8 | 0.2167 f | 0.0213 f | 1.43500 | 95.06 | CaF$_2$ |
| 9 | −0.4622 f | 0.0041 f | | | Air |
| 10 | −0.8608 f | 0.0120 f | 1.65426 | 58.15 | LAC7 |
| 11 | 0.9124 f | 0.2100 f | | | Air |
| 12 | −0.1031 f | 0.0080 f | 1.65426 | 58.15 | LAC7 |
| 13 | −0.1241 f | | | | Air |
| 14 | ∞ | | [Focal Plane] | | | where the radii and the thicknesses are expressed as multiples of the focal length f of the Petzval lens system. It is noted that the "f" of Table II is different from the "f" of Table I. In Table I, f is the focal length of the entire catadioptric imaging system as shown in FIG. 1A, with the dioptric assembly 20 located at position A. In Table II, on the other hand, f refers to the focal length of the field group 25 considered as an independent Petzval lens system.

Also, with reference to Table I, the subsystem comprising the optical components from surface No. 15 through surface No. 23 form a finite conjugate imaging system, which is independently useful as, e.g., a microscope objective. The optical prescription for this finite conjugate imaging system, by itself, is specified in Table III below in terms of its equivalent focal length f (i.e., the focal length of the relay group 26 in FIG. 1A).

TABLE III

OPTICAL PRESCRIPTION FOR FINITE CONJUGATE IMAGING SYSTEM

| Surface No. | Radius | Thickness | $N_e$ | $V_e$ | Material |
|---|---|---|---|---|---|
| 15 | 0.6720 f | 0.0684 f | 1.65426 | 58.15 | LAC7 |
| 16 | 0.5468 f | 0.2014 f | | | Air |
| 17 | 0.4522 f | 0.0855 f | 1.43500 | 95.06 | CaF$_2$ |
| 18 | −1.1377 f | 0.0212 f | | | Air |
| 19 | 1.9364 f | 0.0684 f | 1.65426 | 58.15 | LAC7 |
| 20 | 0.3054 f | 0.0252 f | | | Air |
| 21 | 0.3467 f | 0.0855 f | 1.43500 | 95.06 | CaF$_2$ |
| 22 | −1.2162 f | | | | Air |
| 23 | ∞ | | [Image Plane] | | | where the radii and the thicknesses are expressed as multiples of the focal length f of the finite conjugate imaging system.

Further, with reference to Table I, the subsystem comprising the optical components from surface No. 4 through surface No. 23 form a dioptric infinite conjugate imaging system that is color-corrected at five wavelengths. The optical prescription for this dioptric infinite conjugate imaging system is specified in Table IV below in terms of its equivalent focal length f (i.e., the focal length of the dioptric assembly 20 in FIG. 1A).

TABLE IV

OPTICAL PRESCRIPTION FOR DIOPTRIC INFINITE CONJUGATE IMAGING SYSTEM WITH TWO FOCAL SURFACES

| Surface No. | Radius | Thickness | $N_e$ | $V_e$ | Material |
|---|---|---|---|---|---|
| 4 | 0.0648 f | 0.00224 f | 1.43500 | 95.06 | CaF$_2$ |
| 5 | −0.0720 f | 0.00037 f | | | Air |
| 6 | −0.0692 f | 0.00125 f | 1.65426 | 58.15 | LAC7 |
| 7 | −0.8712 f | 0.09584 f | | | Air |
| 8 | 0.0203 f | 0.00200 f | 1.43500 | 95.06 | CaF$_2$ |
| 9 | −0.0432 f | 0.00038 f | | | Air |
| 10 | −0.0805 f | 0.00112 f | 1.65426 | 58.15 | LAC7 |
| 11 | 0.0853 f | 0.01963 f | | | Air |
| 12 | −0.0096 f | 0.00075 f | 1.65426 | 58.15 | LAC7 |
| 13 | −0.0116 f | 0.02577 f | | | Air |
| 14 | ∞ | 0.00573 f | [1st Focal Plane] | | Air |
| 15 | 0.0049 f | 0.00050 f | 1.65426 | 58.15 | LAC7 |
| 16 | 0.0040 f | 0.00147 f | | | Air |
| 17 | 0.0033 f | 0.00062 f | 1.43500 | 95.06 | CaF$_2$ |
| 18 | −0.0083 f | 0.00016 f | | | Air |
| 19 | 0.0141 f | 0.00050 f | 1.65426 | 58.15 | LAC7 |
| 20 | 0.0022 f | 0.00018 f | | | Air |
| 21 | 0.0025 f | 0.00062 f | 1.43500 | 95.06 | CaF$_2$ |
| 22 | −0.0089 f | | | | Air |
| 23 | ∞ | | [2nd Focal Plane] | | | where the radii and the thicknesses are expressed as multiples of the focal length f of the dioptric infinite conjugate imaging system.

In addition, with reference to Table I, the sybsystem comprising the optical components from surface No. 1 through surface No. 14 form a catadioptric imaging system, which is color-corrected at five wavelengths. The optical prescription for this catadioptric imaging system is specified in Table V below in terms of its equivalent focal length f (i.e., the focal length of the system comprising only the catoptric assembly 21 and the field group 25 in FIG. 1A.).

TABLE V

OPTICAL PRESCRIPTION FOR CATADIOPTRIC IMAGING SYSTEM WITH SINGLE FOCAL SURFACE

| Surface No. | Radius | Thickness | $N_e$ | $V_e$ | Material |
|---|---|---|---|---|---|
| 1 | −0.4000 f | −0.18750 f | [Primary Mirror] | | |
| 2 | −0.0250 f | 0.18750 f | [Secondary Mirror] | | |
| 3 | ∞ | 0.28145 f | [Hole] | | Air |
| 4 | 0.0433 f | 0.00150 f | 1.43500 | 95.06 | CaF$_2$ |
| 5 | −0.0482 f | 0.00024 f | | | Air |
| 6 | −0.0463 f | 0.00083 f | 1.65426 | 58.15 | LAC7 |
| 7 | −0.5825 f | 0.06409 f | | | Air |
| 8 | 0.0135 f | 0.00133 f | 1.43500 | 95.06 | CaF$_2$ |
| 9 | −0.0289 f | 0.00026 f | | | Air |
| 10 | −0.0538 f | 0.00075 f | 1.65426 | 58.15 | LAC7 |
| 11 | 0.0570 f | 0.01313 f | | | Air |
| 12 | −0.0064 f | 0.00050 f | 1.65426 | 58.15 | LAC7 |
| 13 | −0.0078 f | | | | Air |
| 14 | ∞ | | [Focal Plane] | | | where the radii and the thickness are expressed as multiples of the focal lenght f of the catadioptric imaging system comprising the catoptric assembly 21 (i.e., the telescope) and the field group 25 (i.e., the Petzval lens system) as shown in FIG. 1A.

The number of wavelengths for which color correction is achieved, and the extent of the residual chromatic aberration i.e., secondary and higher-order spectra) for the image formed at the second focal surface 28 of the image system of the present invention when the dioptric assembly 20 is located at postion A in FIG. 1A, are indicated by the "wavelength scan" curves of FIGS. 3-6. Similarly, the number of wavelengths for which color correction is achieved, and the extent of the residual chromatic aberration for the image formed at the first focal surface 27, are indicated by the "wavelength scan" curve of FIG. 7.

The concept of color correction of a refractive optical system for particular specified wavelengths refers to the fact that the paraxial marginal ray height of the system is precisely zero for the specified wavelengths, whereby paraxial rays of the specified wavelengths are brought to a common focus on the optic axis of the system. The concept of reduction in secondary and higher-order spectra, on the other hand, refers to a reduction of residual chromatic errors at wavelengths between the particular wavelengths for which color correction is achieved.

It has been found that the "wavelength scan" curves of FIGS. 3-7 do not vary appreciably as the location of the dioptric assembly 20 relative to the catoptric assembly 21 is changed from position A to any other position (as represented by the particular positions B, C and D in FIG. 1A) along the optic axis of the imaging system. In a particular application, the position of the dioptric assembly 20 along the axis of the imaging system could be selected to accommodate the positioning of other optical components such as beam splitters, beam-steering mirrors or optical filters in the space between the catoptric assembly 21 and the dioptric assembly 20.

Figure 3:
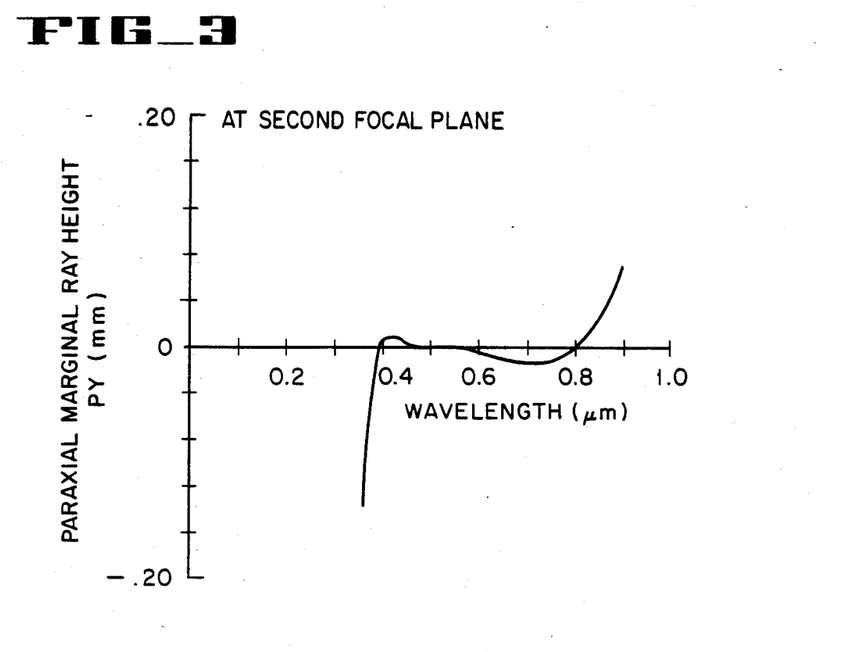
FIG. 3 is a plot of paraxial marginal ray height versus wavelength at the second focal plane of the imaging system of FIG. 1A for a focal length of 100 meters, where the dioptric assembly is located at position A.

In FIG. 3, a plot of paraxial marginal ray height (conventionally designated "PY") versus wavelength at the second focal surface 28 is shown for the catadioptric imaging system of the present invention, where the dioptric assembly 20 is located at position A in FIG. 1A. A paraxial marginal ray passing through an optical system is a ray that originates at an object point on the optic axis of the system and passes through the system in the immediate vicinity of the optic axis. When the object point is infinitely distant from the entrance pupil of the system, a paraxial marginal ray for a particular wavelength enters the system parallel to the optic axis and is refracted by the components of the system to form an image at a paraxial focal surface of the system for that wavelength. The point of intersection of the paraxial marginal ray for the given wavelength with the optic axis of the system defines the paraxial focal point of the system for that wavelength. A surface perpendicular to the optic axis and passing through the paraxial focal point for the given wavelength defines the paraxial focal surface of the system for that wavelength. The location of the paraxial focal point (and therefore the location of the paraxial focal surface) generally varies with wavelength; and this variation is called the chromatic variation of focus, or the axial chromatic aberration, or the longitudinal chromatic aberration.

In general, a paraxial marginal ray from an infinitely distant object point intersects the paraxial focal surface of an optical system for a particular wavelength at a point that is spatially separated from the point of intersection of the optic axis of the system with that paraxial focal surface. The lateral distance defining the separation between the point of intersection of a paraxial marginal ray with a surface and the point of intersection of that surface with the optic axis of the system is called the paraxial marginal ray "height" of the system at that surface.

In general, the value of the paraxial marginal ray height at a given focal surface of an imaging system changes with wavelength due to axial chromatic aberration. A point object cannot generally be imaged as a point (even using only monochromatic light), but instead is imaged as a blur due to monochromatic aberrations and diffraction effects. If polychromatic light (or a continuous spectrum of white light) is used, the resulting image blur has a component due to monochromatic aberrations and a component due to chromatic aberrations, even when diffraction effects are ignored.

The value of the paraxial marginal ray height at a given focal surface for an imaging system at any particular wavelength (e.g., the value of "PY" in the wavelength scan curve of FIG. 3 for the imaging system of the present invention) is a measure of the extent of the geometrical image blur (i.e., the image blur without consideration of diffraction effects) inherent in the system at that particular wavelength. The variation of paraxial marginal ray height with wavelength at a given focal surface provides ar indication of the extent to which axial chromatic aberration is corrected in the system. The wavelength scan curve of FIG. 3 indicates that the imaging system of the present invention is color-corrected at five wavelengths in the visible and near infrared region of the spectrum as indicated by the five crossings of the horizontal axis.

The wavelength scan curve of FIG. 3 is close to the horizontal axis, indicating that paraxial marginal ray height is small, throughout the spectral band from 0.39 micron to 0.8 micron. The ordinate of the curve representing paraxial marginal ray height versus wavelength at a given focal surface is a measure of the radius of the geometrical blur for that particular wavelength at that focal surface. For an optical system that is color-corrected at only two wavelengths, the wavelength scan curve for paraxial marginal ray height would cross the horizontal axis at only two points corresponding to the two wavelengths for which color correction has been achieved. The maximum "height" of the wavelength scan curve for a particular wavelength above or below the horizontal axis between the two crossing points is a measure of the maximum radius of the geometrical image blur for that wavelength at the focal surface, and is what is meant by the "secondary spectrum" for that wavelength interval.

For an optical system that is color-corrected at three wavelengths, the wavelength scan curve for paraxial marginal ray height would cross the horizontal axis at three points. The maximum "height" of the wavelength scan curve in a wavelength band of interest is a measure of the maximum radius of the geometrical image blur, and indicates the tertiary spectrum of the system. The maximum height of the wavelength scan curve in FIG. 3, which pertains specifically to the diffraction-limited imaging system of the present invention, indicates negligible higher-order spectra throughout the spectral band from about 0.39 micron to about 0.80 micron.

Figure 4:
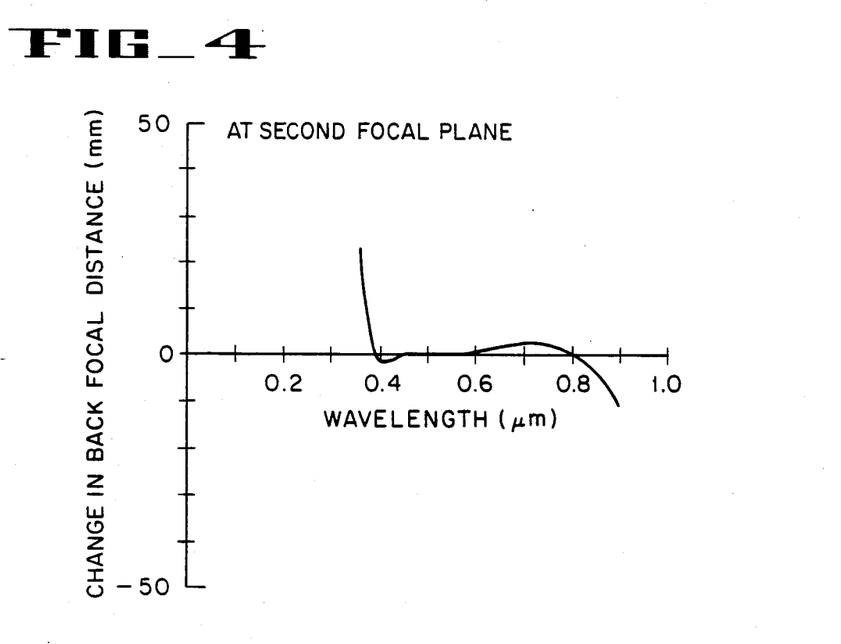
FIG. 4 is a plot of change in back focal distance versus wavelength at the second focal plane of the imaging system of FIG. 1A for a focal length of 100 meters, where the dioptric assembly is located at position A.

In FIG. 4, a plot of change in back focal distance versus wavelength at the second focal surface 28 is shown for the catadioptric imaging system of the present invention, where the dioptric assembly 20 is located at position A in FIG. 1A. The back focal distance of an imaging system for a particular wavelength is defined as the distance along the optic axis of the system between the focal surface for that particular wavelength and the refractive surface closest to that focal surface. For a color-corrected imaging system, paraxial marginal rays at the wavelengths for which color correction has been achieved are brought to a focus at a common focal surface. The back focal distance for those wavelengths for which color correction has been achieved can be considered as a "baseline" back focal distance. Thus, for the imaging system of FIG. 1, for which the relay group 26 is shown in greater detail in FIG. 2B, the "baseline" back focal distance is the distance along the optic axis between the lens element 44 and the second focal surface 28.

For the wavelengths at which color correction has not been achieved (i.e., for the wavelengths between the crossing points on the horizontal axis for the wavelength scan curve of FIG. 3), the paraxial marginal rays are focussed at other focal surfaces whose positions along the optic axis of the imaging system are dependent upon wavelength. The change in back focal distance from the "baseline" back focal distance is shown in FIG. 4 as a function of wavelength. The wavelength scan curve of FIG. 4 provides an indication of the chromatic variation in focal position along the optic axis of the system, and hence is commonly called "longitudinal" or "axial" chromatic aberration.

It is apparent from FIG. 4 that the position of the second focal surface 28 does not change appreciably as a function of wavelength over the spectral band from about 0.39 micron to about 0.80 micron. Thus, the positioning of an instrument to detect the second image formed on the second focal surface 28 can remain constant for an imaging system according to the present invention for all wavelengths throughout the visible and near infrared regions of the spectrum.

Figure 5:
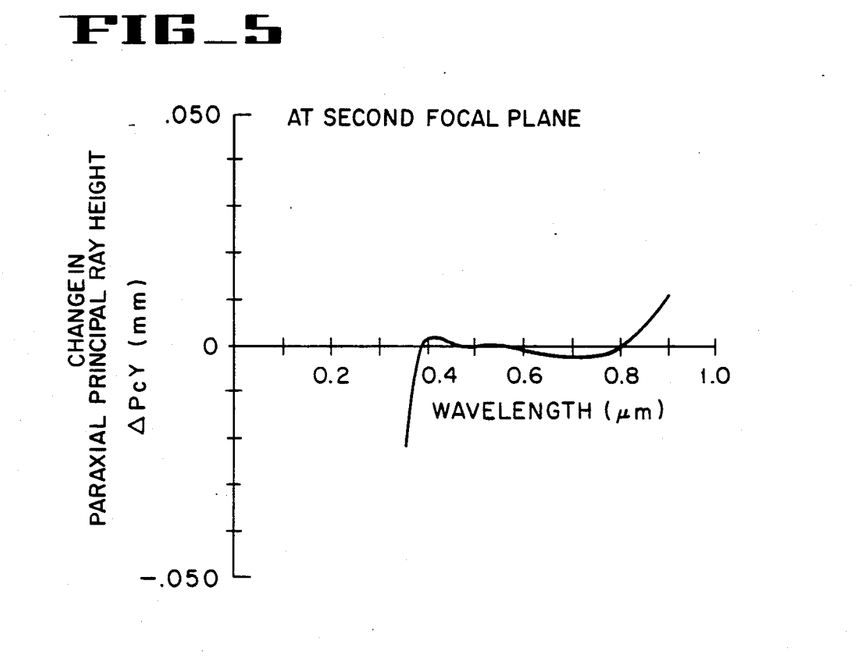
FIG. 5 is a plot of change in paraxial principal ray height versus wavelength at the second focal plane of the imaging system of FIG. 1A for a focal length of 100 meters, where the dioptric assembly is located at position A.

In FIG. 5, a plot of change in paraxial principal ray height (conventionally designated "PcY") versus wavelength at the second focal surface 28 is shown for the catadioptric imaging system of the present invention, where the dioptric assembly 20 is located at position A in FIG. 1A. A paraxial principal ray passing through an optical system is a paraxial ray that originates at an extremity of an extended object and passes through the center of the entrance pupil of the system. A paraxial principal ray (also called a chief ray) for a particular wavelength intersects a focal surface of the system at a point that is spatially separated from the point of intersection of the optic axis with the focal surface. The lateral distance from the optic axis of the system to the point of intersection of the paraxial principal ray with a surface is called the paraxial principal ray "height" for that surface. If that surface is a focal surface, the paraxial principal ray height PcY at that surface corresponds to the geometrical image height for that wavelength.

The value of the paraxial principal ray height at a given focal surface for an imaging system changes with wavelength. For a color-corrected imaging system according to the present invention, the paraxial principal ray height at the focal surface for which color-correction has been achieved can be considered as a "baseline" paraxial principal ray height. In FIG. 5, the change in the value of the paraxial principal ray height from the "baseline" paraxial principal ray height at the second focal surface 28 is plotted as a function of wavelength. This change in paraxial principal ray height with wavelength at a focal surface provides a measure of the chromatic variation of image height, which is commonly called the chromatic difference of magnification, or lateral chromatic aberration, or "lateral color". It is apparent from FIG. 5 that the chromatic difference of magnification at the second focal surface 28 does not change appreciably with wavelength in the spectral band from about 0.39 micron to about 0.80 micron for the imaging system of the present invention.

Figure 6:
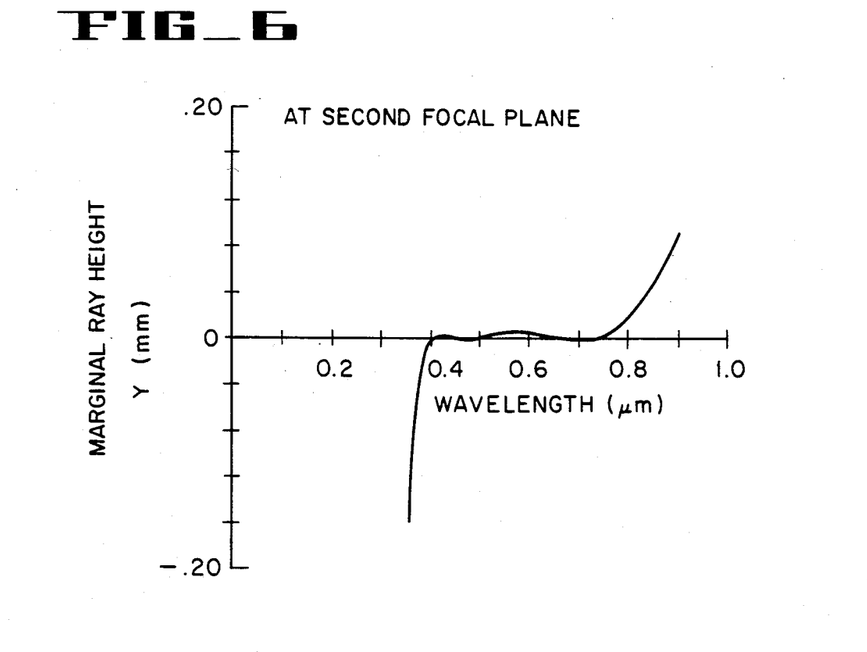
FIG. 6 is a plot of marginal ray height versus wavelength at the second focal plane of the imaging system of FIG. 1A for a focal length of 100 meters, where the dioptric assembly is located at position A.

In FIG. 6, a plot of marginal ray height (conventionally designated "Y") versus wavelength at the second focal surface 28 is shown for the catadioptric imaging system of the present invention, where the dioptric assembly 20 is located at position A in FIG. 1A. A marginal ray passing through an optical system is a ray that originates at an axial object point and grazes the periphery of the entrance pupil of the system so as to define the maximum cone of rays from that object point that can be accepted by the system. For an infinitely distant object, the marginal ray is parallel to the optic axis with a ray height from the optic axis equal to the radius of the entrance pupil of the system.

The parameters (i.e., ray heights and slopes) of a marginal ray passing through an optical system can be calculated by application of Snell's Law. As with a paraxial marginal ray, so also a marginal ray intersects a focal surface of the system at a point that generally is spatially separated from the point of intersection of the optic axis with the focal surface. The lateral separation between the optic axis of the system and the point of intersection of the marginal ray with a surface is designated as the marginal ray "height" for that surface. The value of the marginal ray height at a given focal surface changes with wavelength due to spherical aberration and the chromatic variation of spherical aberration (i.e., spherochromatism) inherent in the system. The value of the marginal ray height for a particular wavelength is a measure of the extent of geometric image blur at that particular wavelength taking spherical aberration into consideration.

It is instructive to compare the wavelength scan curve for marginal ray height as shown in FIG. 6 with the wavelength scan curve for paraxial marginal ray height as shown in FIG. 3. The curve in FIG. 6, which was generated by actual ray tracing according to Snell's Law, shows five crossings of the horizontal axis. The flatness of the curve in FIG. 6 shows that spherochromatism and residual chromatic aberrations are negligible throughout the visible region of the spectrum. It is apparent from the curves of FIGS. 3 and 6 that an imaging system according to the present invention not only provides coincidence of paraxial focus (i.e., paraxial color correction) at five wavelengths, but also provides coincidence of marginal focus (i.e., marginal color correction) at five wavelengths.

Figure 7:
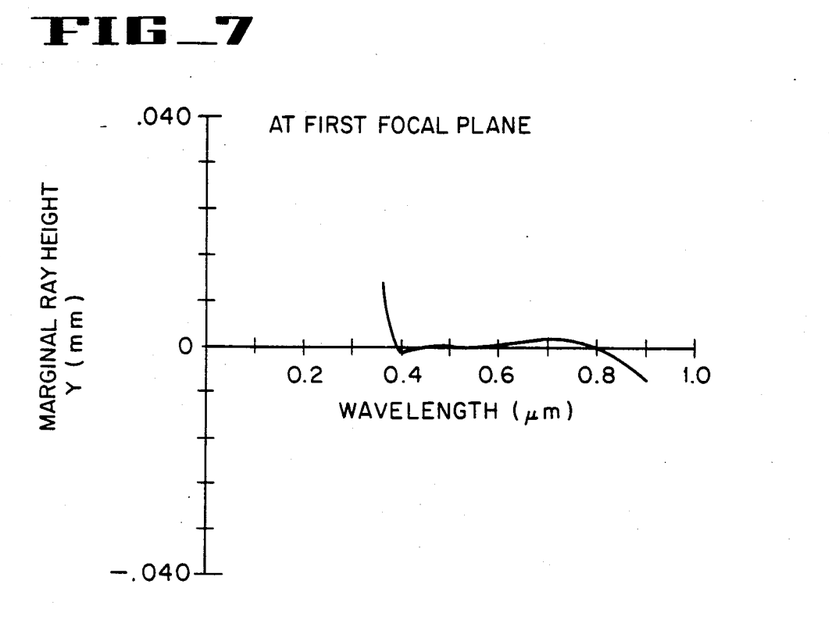
FIG. 7 is a plot of marginal ray height versus wavelength at the first focal plane of the imaging system of FIG. 1A for a focal length of 100 meters, where the dioptric assembly is located at position A.

In FIG. 7, a plot of marginal ray height versus wavelength at the first focal surface 27 is shown for the catadioptric imaging system of the present invention, where the dioptric assembly 20 located at position A in FIG. 1A. The wavelength scan curve of FIG. 7 indicates that the subsystem comprising the catoptric assembly 21 and the Petzval-type field group 25 at f/7.5 provides coincidence of marginal focus at five wavelengths, and also has practically negligible higher-order spectra and is well-corrected for spherochromatism throughout the spectral band from about 0.39 micron to 0.8 micron.

Wavelength scan curves for paraxial marginal ray height, change in back focal distance, change in paraxial principal ray height, and marginal ray height at the second focal surface 28, and wavelength scan curves for marginal ray height at the first focal surface 27 as in FIG. 7, when plotted for the dioptric assembly 20 located at each of the positions B, C and D indicated in FIG. 1A, are substantially identical to the corresponding wavelength scan curves shown in FIGS. 3, 4, 5, 6 and 7. Thus, the various wavelength scans are substantially invariant with respect to the position of the dioptric assembly 20 relative to the position of the catoptric assembly 21. Therefore, a long-focus imaging system having the design form shown in FIG. 1A can be used in a variety of different configurations requiring various dispositions of the dioptric assembly 20 relative to the catoptric assembly 21 without substantially changing the imaging capabilities of the system.

Figure 8:
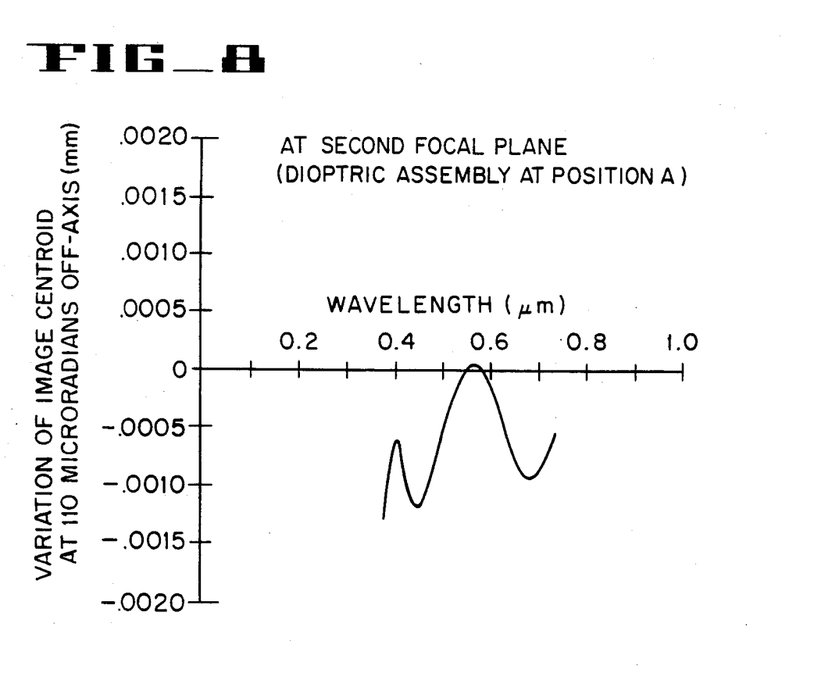
FIG. 8 is a plot of image centroid variation versus wavelength at the second focal plane of the imaging system of FIG. 1A for a focal length of 100 meters, where the dioptric assembly is located at position A.

An imaging system according to the present invention could be used in an instrument for precisely tracking a distant object. In general, the position of the centroid of the image of a distant object at the focal surface of an imaging system changes with the wavelength of the optical radiation emitted by (or used to illuminate) the object. In FIG. 8, the variation of the position of the image centroid of a distant object on the second focal surface 28 is shown as a function of wavelength for the imaging system of the present invention having a focal length of 100 meters, where the dioptric assembly 20 is located at position A in FIG. 1A.

The curve of FIG. 8 indicates the fidelity of an imaging system according to the present invention in preserving the centroid location of the image of a distant object over the entire visible spectrum. Thus, a tracking instrument embodying an imaging system of the present invention enables image centroiding within microradian accuracy to be achieved for a plurality of different narrow wavelength bands within the visible spectrum.

Figure 9:
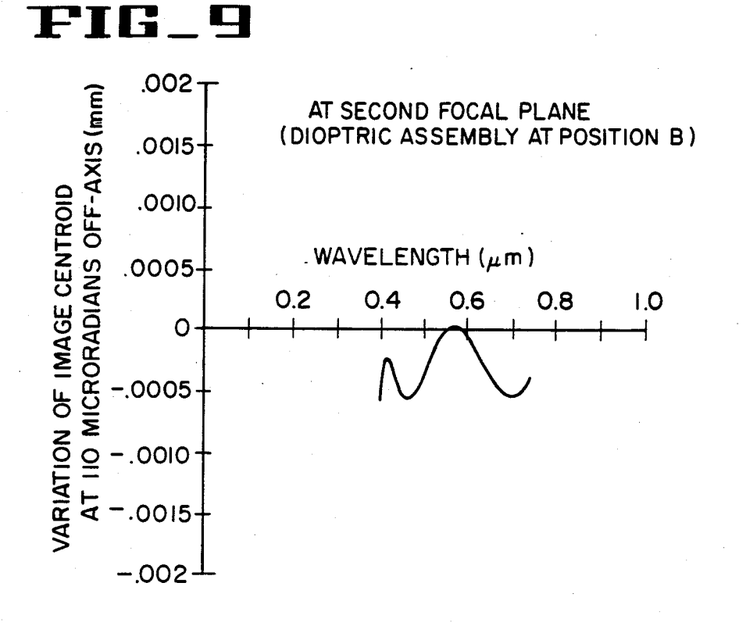
FIG. 9 is a plot of image centroid variation versus wavelength at the second focal plane of the imaging system of FIG. 1A for a focal length of 100 meters, where the dioptric assembly is located at position B.
Figure 10:
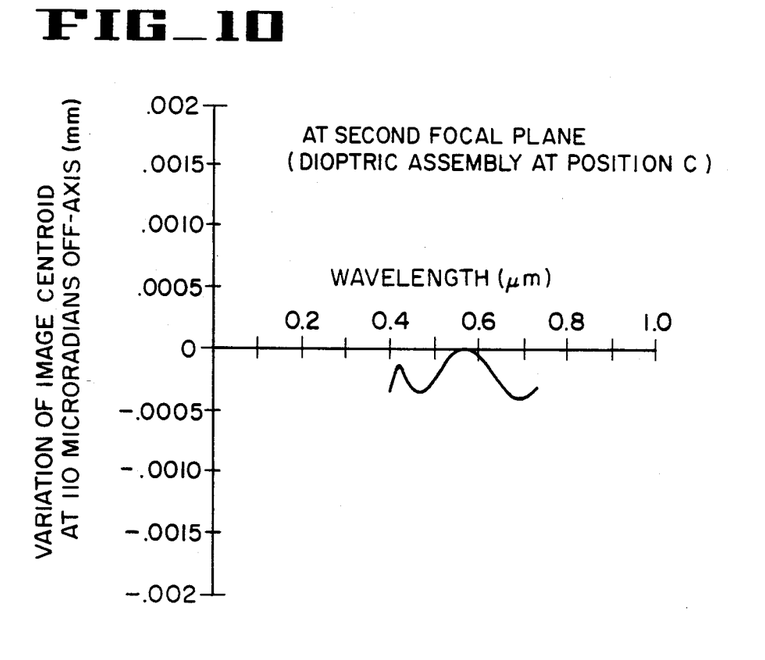
FIG. 10 is a plot of image centroid variation versus wavelength at the second focal plane of the imaging system of FIG. 1A for a focal length of 100 meters, where the dioptric assembly is located at position C.
Figure 11:
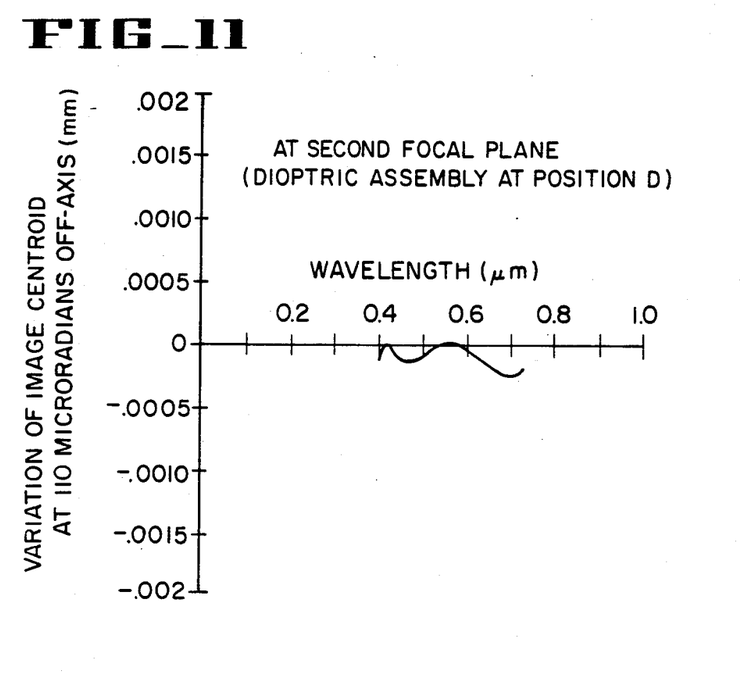
FIG. 11 is a plot of image centroid variation versus wave length at the second focal plane of the imaging system of FIG. 1A for a focal length of 100 meters, where the dioptric assembly is located at position D.

In FIGS. 9, 10 and 11, the variation of the position of the image centroid of a distant object on the second focal surface 28 for the imaging system of the present invention is shown as a function of wavelength for a focal length of 100 meters, where the dioptric assembly 20 is located at positions B, C and D, respectively, in FIG. 1A. A comparison of the wavelength scan curves of FIGS. 8, 9, 10 and 11 indicates that the variation of image centroid position with respect to wavelength for an optical imaging system according to the present invention changes, but only to a minor extent, with change in the position of the dioptric assembly 20 relative to the catoptric assembly 21. In general, the variation of the position of the image centroid provided by a tracking instrument using an imaging system according to the present invention diminishes as the spacing between the dioptric assembly 20 and the catoptric assembly 21 decreases.

This invention has been described above in terms of a particular long-focus refractive imaging system designed with particular focal ratios and magnifications using particular optical materials that are commercially available at the present time. However, other long-focus refractive imaging systems with different focal ratios and magnifications, which are designed according to the teachings of the foregoing disclosure and accompanying drawing, would likewise be within the scope of the invention. The embodiments of the invention described herein are to be considered as illustrative of the invention, which is defined more generally by the following claims and their equivalents.

I claim:
1. A catadioptric imaging system comprising:
(a) a catoptric assembly configured as a telescope to gather optical radiation from a distant object and to form the radiation so gathered into a beam, and
(b) a dioptric assembly positioned in said beam, said dioptric assembly forming a first image of said distant object at a first focal surface and a second image of said distant object at a second focal surface, said first and second images being conjugate real images having different focal ratios and different magnifications, said dioptric assembly bringing more than two optical wavelengths to a common first focus at said first focal surface and also bringing said wavelengths to a common second focus at said second focal surface.

2. The catadioptric imaging system of claim 1 wherein said catoptric assembly comprises:
(a) a primary mirror having a concave paraboloidal reflecting surface to gather the optical radiation from said distant object, said primary mirror having an aperture, and
(b) a secondary mirror having a convex paraboloidal reflecting surface to form the optical radiation gathered by said primary mirror into said beam and to direct said beam through said aperture in said primary mirror to said dioptric assembly.

3. The catadioptric imaging system of claim 2 wherein said primary and secondary mirrors have foci that coincide with each other.

4. The catadioptric imaging system of claim 1 wherein said dioptric assemby comprises a plurality of lens elements, each of said lens elements being made from one of only two different kinds of optical materials, at least one of said lens elements being made of a first one of said optical materials and at least one other of said lens elements being made of a second one of said optical materials, said first and second optical materials having different indices of refraction.

5. The catadioptric imaging system of claim 1 wherein said first optical material is calcium fluoride crystal and said second optical material is Hoya LAC7 glass.

6. The catadioptric imaging system of claim 1 wherein said dioptric assembly brings five wavelengths to said common first focus at said first focal surface.

7. The catadioptric imaging system of claim 6 wherein said dioptric assembly brings an infrared wavelength, three visible wavelengths and an ultraviolet wavelength to said common first focus at said first focal surface, and simultaneously brings said wavelengths to said common second focus at said second focal surface.

8. An optical imaging system comprising a catoptric assembly and a dioptric assembly, said catoptric assembly comprising a primary mirror for gathering light from a distant object and a secondary mirror for reflecting the gathered light as a nonconverging beam along an optic axis of the system, said dioptric assembly comprising a plurality of lens elements arranged in two groups, said groups being a field group and a relay group, said field group being a lens system of the Petzval type and said relay group being a finite conjugate imaging system, said field group bringing more than two optical wavelengths to a common first focus at a first focal surface, said relay group bringing said wavelengths to a common second focus at a second focal surface.

9. The optical imaging system of claim 8 wherein said field group comprises a first lens element, a second lens element, a third lens element, a fourth lens element and a fifth lens element, said first, second, third, fourth and fifth lens elements being consecutively disposed along said optic axis, said first lens element being made of calcium fluoride crystal, said second lens element being made of Hoya LAC7 glass, said third lens element being made of calcium fluoride crystal, said fourth lens element being made of Hoya LAC7 glass, and said fifth lens element being made of Hcya LAC7 glass.

10. The optical imaging system of claim 9 wherein said first lens element has a surface with a positive radius of curvature of approximately 0.004060 times the focal length of the system and a surface with a negative radius of curvature of approximately 0.004514 times the focal length of the system, said second lens element has a surface with a negative radius of curvature of approximately 0.004340 times the focal length of the system and a surface with a negative radius of curvature of approximately 0.054611 times the focal length of the system, said third lens element has a surface with a positive radius of curvature of approximately 0.001270 times the focal length of the system and a surface with a negative radius of curvature of approximately 0.002708 times the focal length of the system, said fourth lens element has a surface with a negative radius of curvature of approximately 0.005043 times the focal length of the system and a surface with a positive radius of curvature of approximately 0.005345 times the focal length of the system, and said fifth lens element has a surface with a negative radius of curvature of approximately 0.000604 times the focal length of the system and a surface with a negative radius of curvature of approximately 0.000727 times the focal length of the system, said first lens element having a thickness along said optic axis of approximately 0.000141 times the focal length of the system, said second lens element being separated from said first lens element along said optic axis by approximately 0.000023 times the focal length of the system, said second lens element having a thickness along said optic axis of approximately 0.000078 times the focal length of the system, said third lens element being separated from said second lens element along said optic axis by approximately 0.006008 times the focal length of the system, said third lens element having a thickness along said optic axis of approximately 0.000125 times the focal length of the lens system, said fourth lens element being separated from said third lens element along said optic axis by approximately 0.000024 times the focal length of the system, said fourth lens element having a thickness along said optic axis of approximately 0.000070 times the focal length of the system, said fifth lens element being separated from said fourth lens element along said optic axis by approximately 0.001230 times the focal length of the system, said fifth lens element having a thickness along said optic axis of approximately 0.000047 times the focal length of the system.

11. The optical imaging system of claim 8 wherein said relay group comprises a sixth lens element, a seventh lens element, an eighth lens element and a ninth lens element, said sixth, seventh, eighth and ninth lens elements being consecutively disposed along said optic axis, said sixth lens element being made of Hoya LAC7 glass, said seventh lens element being made of calcium fluoride crystal, said eighth lens element being made of Hoya LAC7 glass, and said ninth lens element being made of calcium fluoride glass.

12. The optical imaging system of claim 11 wherein said sixth lens element has a surface with a positive radius of curvature of approximately 0.000306 times the focal length of the system and a surface with a positive radius of curvature of approximately 0.000249 times the focal length of the system, said seventh lens element has a surface with a positive radius of curvature of approximately 0.000206 times the focal length of the system and a surface with a negative radius of curvature of approximately 0.000519 times the focal length of the system, said eighth lens element has a surface with a positive radius of curvature of approximately 0.000884 times the focal length of the system and a surface with a positive radius of curvature of approximately 0.000139 times the focal length of the system, and said ninth lens element has a surface with a positive radius of curvature of approximately 0.000158 times the focal length of the system and a surface with a negative radius of curvature of approximately 0.000555 times the focal length of the system, said sixth lens element having a thickness along said optic axis of approximately 0.000031 times the focal length of the system, said seventh lens element being separated from said sixth lens element along said optic axis by approximately 0.000092 times the focal length of the system, said seventh lens element having a thickness along said optic axis of approximately 0.000039 times the focal length of the system, said eighth lens element being separated from said seventh lens element along said optic axis by approximately 0.000010 times the focal length of the system, said eighth lens element having a thickness along said optic axis of approximately 0.000030 times the focal length of the system, said ninth lens element being separated from said eighth lens element along said optic axis by approximately 0.000011 times the focal length of the system, said ninth lens element having a thickness along said optic axis of approximately 0.000039 times the focal length of the system.

* * * * *